United States Patent
Singireddy

(10) Patent No.: US 9,959,792 B2
(45) Date of Patent: May 1, 2018

(54) SYSTEM AND METHOD TO PLACE SUBJECTIVE MESSAGES ON A VEHICLE

(71) Applicant: GM GLOBAL TECHNOLOGY OPERATIONS LLC, Detroit, MI (US)

(72) Inventor: Anvesh Singireddy, Farmington Hills, MI (US)

(*) Notice: Subject to any disclaimer, the term of this patent is extended or adjusted under 35 U.S.C. 154(b) by 0 days. days.

(21) Appl. No.: 15/280,076

(22) Filed: Sep. 29, 2016

(65) Prior Publication Data

US 2018/0090039 A1 Mar. 29, 2018

(51) Int. Cl.
*G09F 21/00* (2006.01)
*G09F 21/02* (2006.01)
*B60Q 1/50* (2006.01)
*G06K 9/00* (2006.01)

(52) U.S. Cl.
CPC ............. *G09F 21/02* (2013.01); *B60Q 1/503* (2013.01); *G06K 9/00791* (2013.01)

(58) Field of Classification Search
CPC ....... G09F 21/02; G09F 21/048; B60Q 1/503; G06K 9/00791; G06K 9/209; G06K 9/00671
See application file for complete search history.

(56) References Cited

U.S. PATENT DOCUMENTS

| | | | |
|---|---|---|---|
| 6,324,533 B1 | 11/2001 | Agrawal et al. | |
| 7,069,197 B1 | 6/2006 | Saidane | |
| 8,391,615 B2 | 3/2013 | Wu et al. | |
| 8,676,432 B2 | 3/2014 | Patnaik | |
| 2010/0135527 A1* | 6/2010 | Wu | G06K 9/00664 382/103 |
| 2011/0119128 A1 | 5/2011 | Fang et al. | |
| 2016/0098756 A1* | 4/2016 | Ayre | G09F 21/048 705/14.63 |
| 2016/0259977 A1* | 9/2016 | Asbun | A61B 5/165 |

* cited by examiner

*Primary Examiner* — Ping Hsieh

(57) ABSTRACT

A system to exhibit subjective messages on a vehicle including a memory, controller, transceiver, external display, camera, image recognition module, and technology platform. The memory is configured to comprise modules of executable instructions. The controller is configured to read and execute the modules. The transceiver is configured to communicate data transmissions. The external display is configured to exhibit information on the vehicle, visible in the external environment. The camera is configured to capture an image of the vehicle environment. The executable instructions enable the controller to: receive an image of the vehicle environment comprising a selected object; perform the image recognition module to identify the selected object; receive the results of the image recognition module; communicate the results to the technology platform; receive subjective message information from the technology platform; and operate the external display to exhibit the subjective message information to the vehicle environment.

18 Claims, 11 Drawing Sheets

SYSTEM AND METHOD TO PLACE SUBJECTIVE MESSAGES ON A VEHICLE

INTRODUCTION

Outdoor structures are well-known in the advertising field to promote products, services, and announcements. Some examples include billboards, digital signs in urban locations, and the exterior vertical sides of truck trailers and busses. However, such signs advertise in a static manner and do not take into account the viewer's own interest. As a result, they can be inefficient in generating positive results for the sponsor. It is therefore desirable to provide a responsive advertising system and methodology which takes into account the interests of its viewership.

SUMMARY

A system to exhibit one or more subjective messages on a vehicle is presented herein. The system includes a memory, controller, transceiver, external display, camera, image recognition module, and technology platform. The memory is configured to include one or more modules of executable instructions. The controller is configured to read and execute the modules. The transceiver is configured to communicate one or more data transmissions. The external display is configured to exhibit information on the vehicle, the information being visible in the environment external to the vehicle. The camera is configured to view or capture or view and capture an image of a selected portion of the vehicle environment. Moreover, the executable instructions enable the controller to: receive (from the camera) an image of the vehicle environment including a selected object; perform the image recognition module to identify the selected object; receive the results of the image recognition module; communicate the results (via the transceiver) to the technology platform; receive subjective message information (via the transceiver) from the technology platform; and operate the external display to exhibit the subjective message information to the vehicle environment.

The system may further include a sensor module, the sensor module being configured to monitor vehicle environment dynamics. The executable instructions may further enable the controller to: receive (from the sensor module) vehicle environment dynamics information; and manipulate the subjective message information based on the vehicle environment dynamics information. The vehicle dynamics information may include at least one of GPS location information, speedometer data information, odometer data information, vehicle suspension compression ratio information, anti-lock brake activity information, vehicle environment temperature data information, vehicle environment ambient light information, windshield wiper power information; and the manipulation of the subjective message may include adjustments to at least one of the font size, image color scheme, and image brightness.

The image recognition module may include: a keypoints-based comparison; a visual symbol comparison including a comparison of at least one character or symbol that appears on or in connection with the selected object, wherein the visual symbol comparison includes a cosine comparison; a region-based color comparison; and a sensor modalities analysis. The image recognition module may include a comparison of one or more text, logos, alphanumeric characters, the observable characteristics of the driver or passenger (or both), or a combination thereof. The technology platform may be an advertising exchange. The subjective message may be commercial in nature. The vehicle environment may be located behind the vehicle.

A method to exhibit one or more subjective messages on a vehicle is also presented herein. The method includes: providing a memory configured to include one or more modules of executable instructions; providing a controller configured to read and execute the modules; providing a transceiver configured to communicate one or more data transmissions; providing an external display configured to exhibit information on the vehicle, the information being visible in the environment external to the vehicle; providing a camera configured to view or capture or view and capture an image of a selected portion of the vehicle environment; providing an image recognition module; providing a technology platform; receiving (from the camera) an image of the vehicle environment including a selected object; performing (via the controller) the image recognition module to identify the selected object; receiving (at the controller) the results of the image recognition module; communicating (via the transceiver) the results to the technology platform; receiving (via the transceiver) subjective message information from the technology platform; and operating (via the controller) the external display to exhibit the subjective message information to the vehicle environment.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
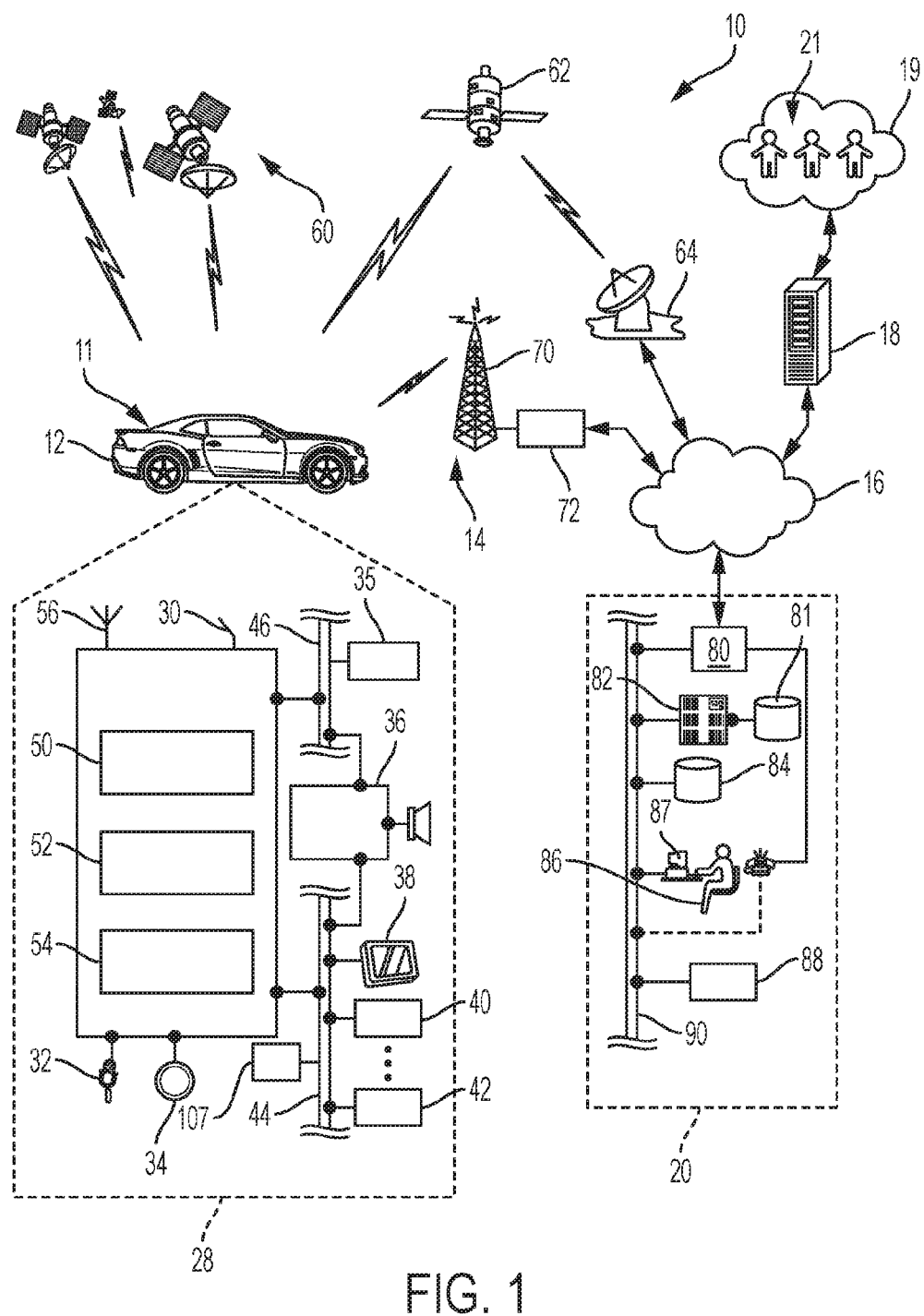
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be understood that the term "vehicle" is to be broadly defined. Therefore, it should be appreciated that other vehicle embodiments including, but not limited to, motorcycles, trucks, trailers hitched onto 18-wheel trucks, sports utility vehicles (SUVs), military vehicles (e.g., HMMWVs), emergency vehicles (e.g., ambulances and fire trucks), recreational vehicles (RVs), marine vessels (e.g., boats), aircraft, helicopters, etc., can also be considered vehicles for the disclosed system and method. Some of the vehicle electronics 28 is shown generally in FIG. 1 and includes a telematics unit 30, a microphone 32, one or more pushbuttons or other control inputs 34, an audio system 36, a visual display 38, external display 107, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as GSM or CDMA and thus includes a standard cellular chipset 50 for voice communications like hands-free calling, a wireless modem for data transmission (i.e., a transceiver), an electronic processing device 52, at least one digital memory device 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein. Digital memory device 54 may have a variety of software application modules installed thereon, such as, but not limited to, an image recognition module (discussed below).

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the modules mentioned herein could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit 30.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle), to VSM 42, or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, another VSM 42 can be a body control module that governs various electrical components located throughout the vehicle, like the vehicle's power door locks and headlights, another VSM 42 can be a travel dynamics module (TDM) that monitors myriad real-time data outputs of vehicle operations such as the speedometer and odometer, and another VSM 42 can be a vehicle dynamics module (VDM) that monitors myriad vehicle dynamics outputs such as the vehicle suspension compression ratio, anti-lock brake activity, vehicle environment temperature, vehicle environment ambient light, and windshield wiper power. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, rear view camera 35 (backup/reversing camera), audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Rear view camera 35 is a video camera coupled to vehicle bus 44 and can sense objects as well as provide a view of the driving environment located directly behind vehicle 12. Camera 35 may further include the ability to generate digital images and videos as bitmapped data representations of tangible objects behind vehicle 12 (i.e., digital image information). Rear view camera 35 may be embodied as a wide-angle or fisheye lens to allow the camera to see an uninterrupted horizontal path from one rear corner to the other.

Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). External display 107 is preferably a graphics display such as, but not limited to, a LCD, LED, or OLED that can exhibit information on the vehicle such as, for example, the back-glass window 11 (e.g., a transparent and bendable OLED display), roof (e.g., a rugged LED or LCD display), or side panel (e.g., a rugged LCD, LED, or OLED display) and is large enough for the information to be visible to a person in the environment external to vehicle 12. Various other vehicle user interfaces can also be utilized, as the interfaces of FIG. 1 are only an example of one particular implementation. It should be understood that external display 107 may be configured to exhibit information on vehicle locations other than back-glass window 11 or the vehicle's roof or side panel.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by skilled artisans, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network connected to one or more landline telephones and connects wireless carrier system 14 to data center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information, and other vehicle data can be uploaded from the vehicle 12 via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, memory databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82.

Controller 81 may control, send, and/or receive data information (e.g., data transmissions) from one or more of the databases 84, telematics unit 30, and remote computing entities 18. For example, via computer 18 (or directly), controller 81 may be in communication with one or more technology platforms 19 such as an advertising exchange (e.g., AppNexus, AOL's Marketplace, Microsoft Ad Exchange, OpenX, Rubicon Project Exchange, Smaato, AdECN, Doubleclick, etc.) to provide certain telematics unit 30 and/or data center 20 compiled information and receive responding advertising information. It should be appreciated that an advertising exchange 19, for example, is generally known as a technology platform which facilitates the buying and selling of media advertising inventory from multiple advertising networks.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store information, for example a recommendations data structure, consumer information, one or more topographical mapping databases, GPS module, VSM 42 information, and image recognition module 100 (discussed below). Data transmissions may also be conducted by wireless systems, such as 802.11x, GPRS, and the like. Although the illustrated embodiment has been described as it would be used in conjunction with a manned data center 20 using live advisor 86, it will be appreciated that the data center 20 can instead utilize VRS 88 as an automated advisor or, a combination of VRS 88 and the live advisor 86 can be used.

Image Recognition Module

Figure 2:
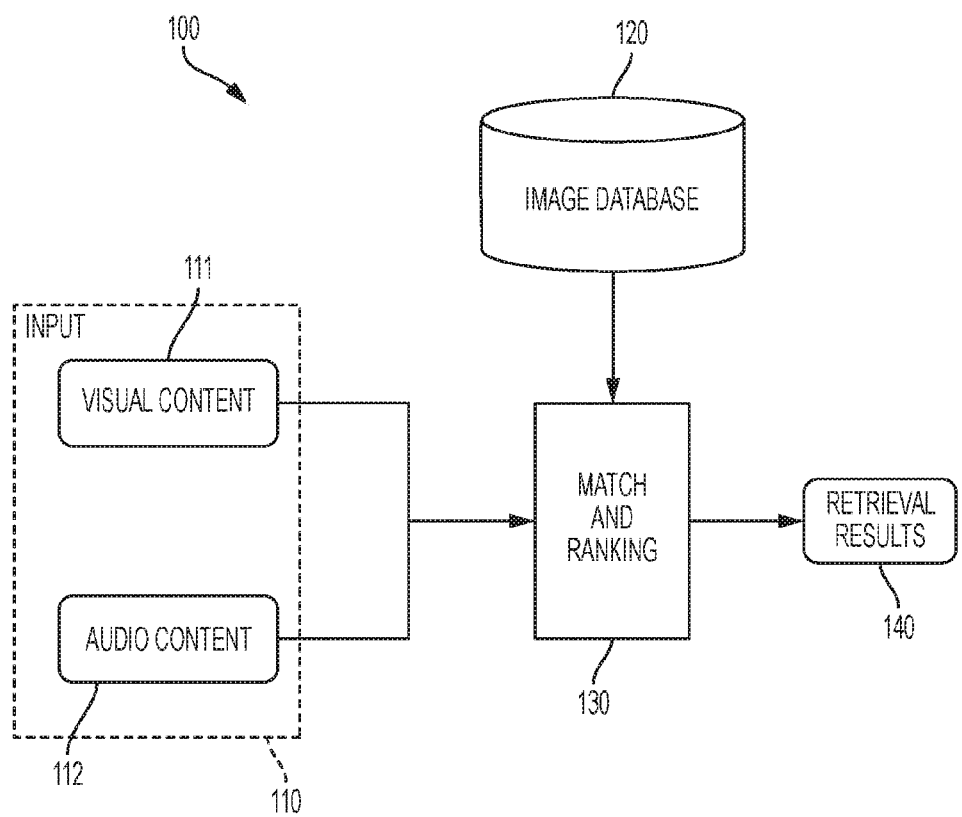
FIG. 2 is a schematic representation of an exemplary constraint-based image recognition system flow according to an aspect of the system and method presented herein.

FIG. 2 shows an exemplary schematic representation of an embodiment of a system flow for a constraint-based image recognition module 100, which may be performed to identify at least one object in the targeted image, and which may be incorporated into to an embodiment of the system and method herein. The subject matter of the exemplary embodiment of the constraint-based image recognition algorithmic-based software module is disclosed in U.S. Pat. No. 8,391,615 titled "Image recognition algorithm, method of identifying a target image using same, and method of selecting data for transmission to a portable electronic device", issued Mar. 5, 2013, as originally assigned to the Intel Corporation of Santa Clara, Calif., the pertinent portions of which are incorporated herein through the discussion below. As illustrated in FIG. 2, system flow 100 takes an input 110, which, as illustrated, includes visual content 111, sensor modalities 112, and audio content 113, and, together with information retrieved from an image database 120, performs a match and ranking procedure 130 in order to arrive at retrieval results 140. System flow 100 will be discussed below in greater detail.

Embodiments of the system and method presented herein utilize sensor modalities such as location system data, 3D accelerometer data, and gyroscope and digital compass information to reduce image search complexity. Location system data can include data from the GPS module, a wide area network (WAN), a wireless network, and the like. For example, if the query image's GPS location is near "50 Centre Street, Concord, New Hampshire", the query image need not be compared with images at significantly different GPS locations. Thus, for example, the query image would not be confused with images of houses in Chicago or Munich, Germany.

Furthermore, embodiments of the invention complement image recognition with text and logos appearing in the scene from user inputs using optical character recognition (OCR) techniques. Text-based retrieval has the advantages of low computational cost, low storage requirements, and low transmission bandwidth. These text-based inputs help the search system zoom into a reduced search space in real time. Text information is also helpful for differentiating objects with similar appearances. As mentioned above, certain embodiments also employ an advanced image recognition algorithm that combines region-based color comparison and keypoints-based comparison. The combination of matching results of both visual feature spaces takes the benefits from both features and provides a robust image recognition system to deal with different lighting conditions, viewing perspectives, rotations, and so forth.

Figure 3:
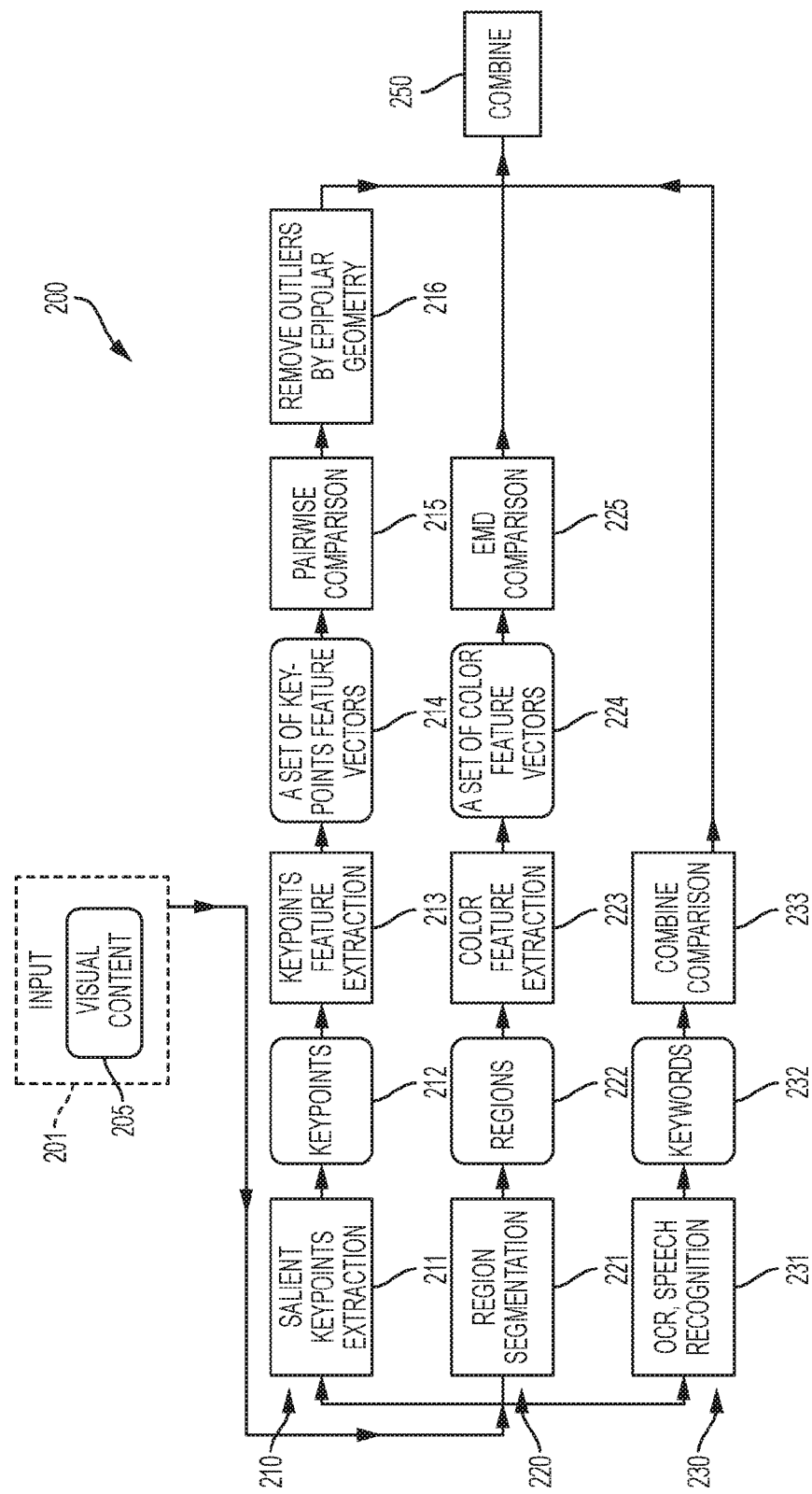
FIGS. 3 and 4 are schematic representations of an exemplary image recognition module according to an aspect of the system and method presented herein.

FIG. 3 is a schematic representation of an exemplary image recognition algorithm 200 according to an aspect of the system and method presented herein. As illustrated in FIG. 2, image recognition algorithm 200 includes a keypoints-based comparison 210 and a region-based color comparison 220.

Keypoints-based comparisons are invariant to image scale and image rotation and are partially invariant to changes in viewpoint and illumination. Multiple images of the same object are thus less likely to be falsely identified as non-matches when the images have been processed using keypoints-based comparison techniques, even where those images were taken under different lighting conditions, from different angles and distances, etc. As an example, keypoints-based comparison 210 may include a salient keypoints extraction procedure 211 resulting in the identification of keypoints 212. Keypoints feature extraction 213 produces a set of keypoints feature vectors 214. These may be processed using a pairwise comparison 215. The comparison may be improved by utilizing epipolar geometry constraints 216 or other known projective geometry techniques in order to remove keypoint matching outliers and to enforce the geometric co-location of feature points representing a particular object of interest.

Pairwise comparison 215, according to one embodiment, involves a direct comparison of two images using the keypoints from each image. For example, if Image 1 has Keypoints A and B, and Image 2 has Keypoints C and D then pairwise comparison 215 will build a bi-partite graph including distances A-C, A-D, B-C, B-D. The distances are ranked and the smallest distance is determined, after which the next smallest distance not involving either point from the smallest distance is identified. Using the small sample size of the foregoing example, once A-C is identified as the smallest distance then B-D is left as the only remaining distance that does not include either A or C. Distances A-C and B-D are then added together in order to obtain a sum. If this sum is "small," i.e., within a certain pre-selected range, then Image 1 and Image 2 can be identified as being images of the same object. This pre-selected range is application-dependent and may be adjusted up or down in order to identify matching images in greater or lesser numbers, as desired.

Pairwise comparison 215 has the advantage of being symmetric. Other comparisons may not be symmetric. In essence, they may depend on which image is identified as the first image—including those that compare each keypoint of an image to the keypoints of multiple images (rather than to one image at a time) from a database in an attempt to find a closest match.

Region-based color comparison is a robust comparison strategy because a region of pixels is more stable with respect to noise and distortions than a single pixel and more precise than whole images containing multiple objects. In various embodiments, region-based color comparison 220 may involve use of color correlograms, color red-green-blue (RGB) histograms, or other suitable color-related features. For example, region-based color comparison 220 may include a region segmentation procedure 221 resulting in the identification of regions 222. Color feature extraction 223 produces a set of color feature vectors 224 that may be processed using an earth mover's distance (EMD) comparison 225, as known in the art.

As further illustrated in FIG. 3, image recognition algorithm 200 may further include a visual symbol comparison 230. For example, visual symbol comparison 230 can compare text, logos, alphanumeric characters, driver observable characteristics, passenger observable characteristics, and other demographic and/or psychographic oriented characters and symbols that appear on or in connection with an object in an image (i.e., the following vehicle and driver and/or passenger). As another example, visual symbol comparison 230 may make use of techniques 231 such as, but not limited to, OCR in order to arrive at keywords 232. These may be compared with a cosine comparison 233 according to techniques that are known in the art. Visual symbol comparison 230, keypoints-based comparison 210, and region-based color comparison 220 may be combined 250 in a process analogous to match and ranking procedure 130 in order to arrive at retrieval results 140.

Image recognition algorithm 200 may operate on an input 201 with a visual content 205. As an example, keypoints-based comparison 210, region-based color comparison 220, and visual symbol comparison 230 can take their inputs from visual content 205. In certain instance, image recognition algorithm 200 may further include an analysis of audio content. It should be understood that traditional speech recognition techniques may be used in order to obtain keywords from this audio content 206.

Figure 4:
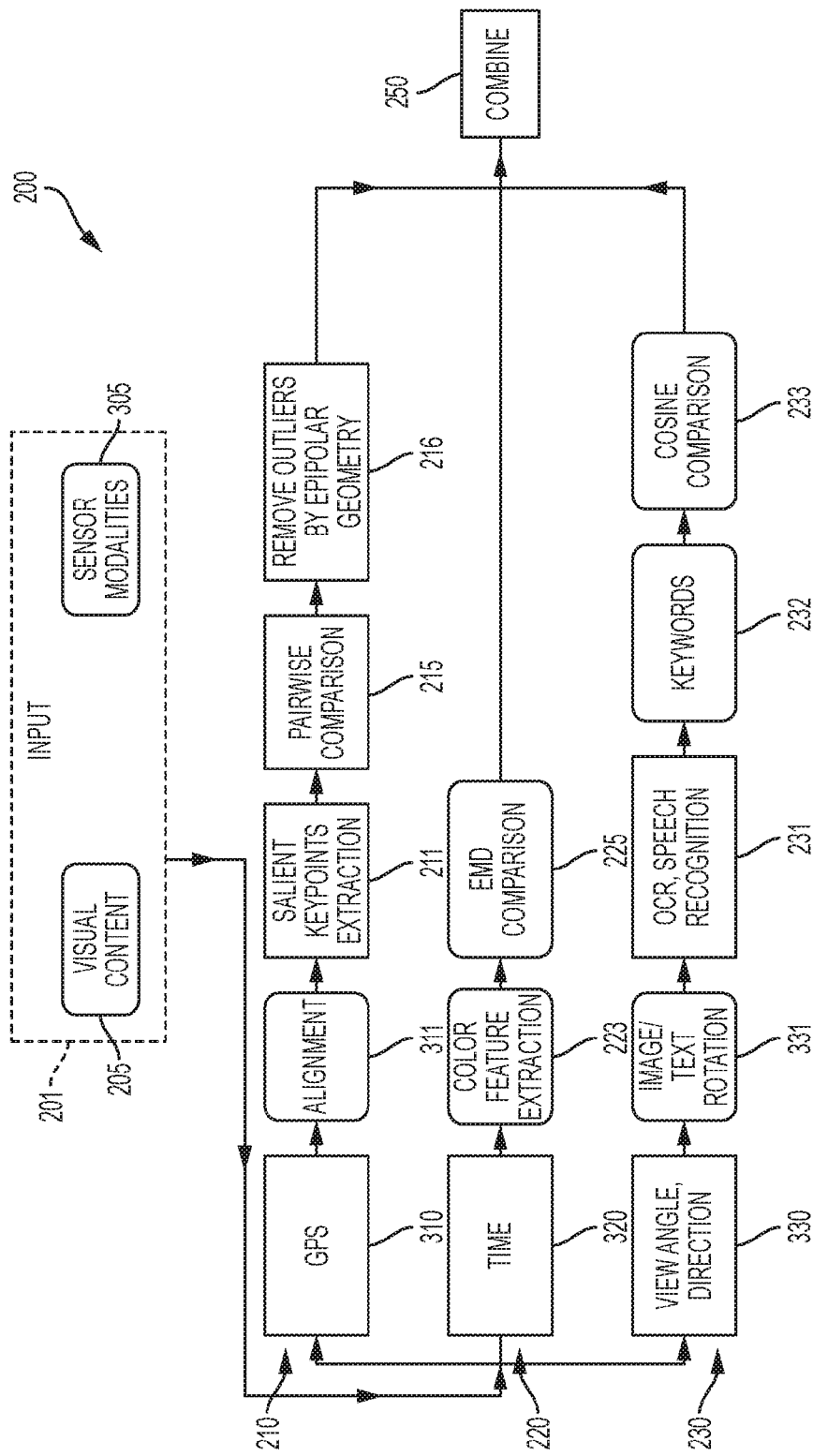

In one embodiment, image recognition algorithm 200 further incorporates a sensor modalities analysis. This analysis is illustrated in FIG. 4, which is a schematic representation of image recognition algorithm 200 according to an embodiment of the system and method presented herein. For simplicity, certain elements of image recognition algorithm 200 appearing in FIG. 2 have been omitted.

As illustrated, input 201 of image recognition algorithm 200 can further include sensor modalities 305. These may include GPS data 310 or other suitable location sensor data, alignment information 311, time 320, view angle and direction data 330, and the like. Thus, one embodiment combines image content (e.g., visual content 205) with sensor modalities 305 to improve image recognition accuracy and efficiency. For example, given a GPS location, view angle, direction, etc. two images of the same object taken from different viewing angles and directions can be aligned, using view angle and direction data 330, before keypoints extraction. By doing that, identical objects captured at different rotations 331, view perspectives, etc. can be matched more accurately. As another example, if the capture time 320 shows that one image was taken during the daytime and the other was taken during the evening hours, color comparison will not be used, in order to reduce matching errors that may otherwise arise as a result of the large color changes brought on by day/evening and day/night lighting differences. In addition, OCR accuracy requires that text be located in horizontal position. With the aid of sensor information 330 such as view angle, direction, etc., images may be rotated, if necessary, to a horizontal position in order to increase the accuracy of OCR process 231. As shown in FIG. 3, sensor modalities 305 may occur as an initial step in image recognition algorithm 200. Sensor modalities 305 may act as an extra layer of refinement in the image identification process that can reduce the size of the image search space. It should be understood that image recognition algorithms, discussed herein (FIGS. 2-4), may make up part or all of one embodiment of a constraint-based image recognition module 100. It has been envisioned that other algorithms may be incorporated into the substance of module 100.

Figure 5:
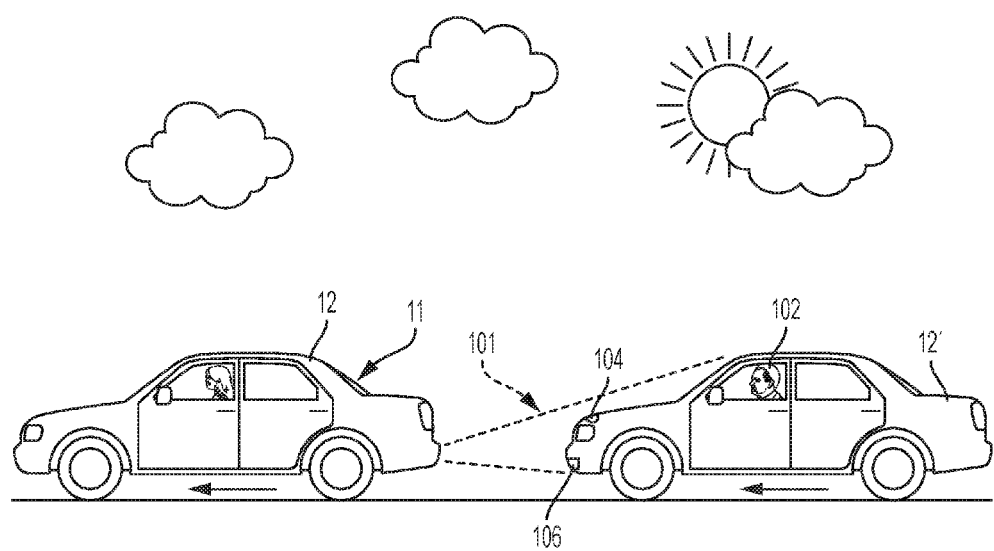
FIG. 5 shows the environment in which the method and system may be implemented.
Figure 6:
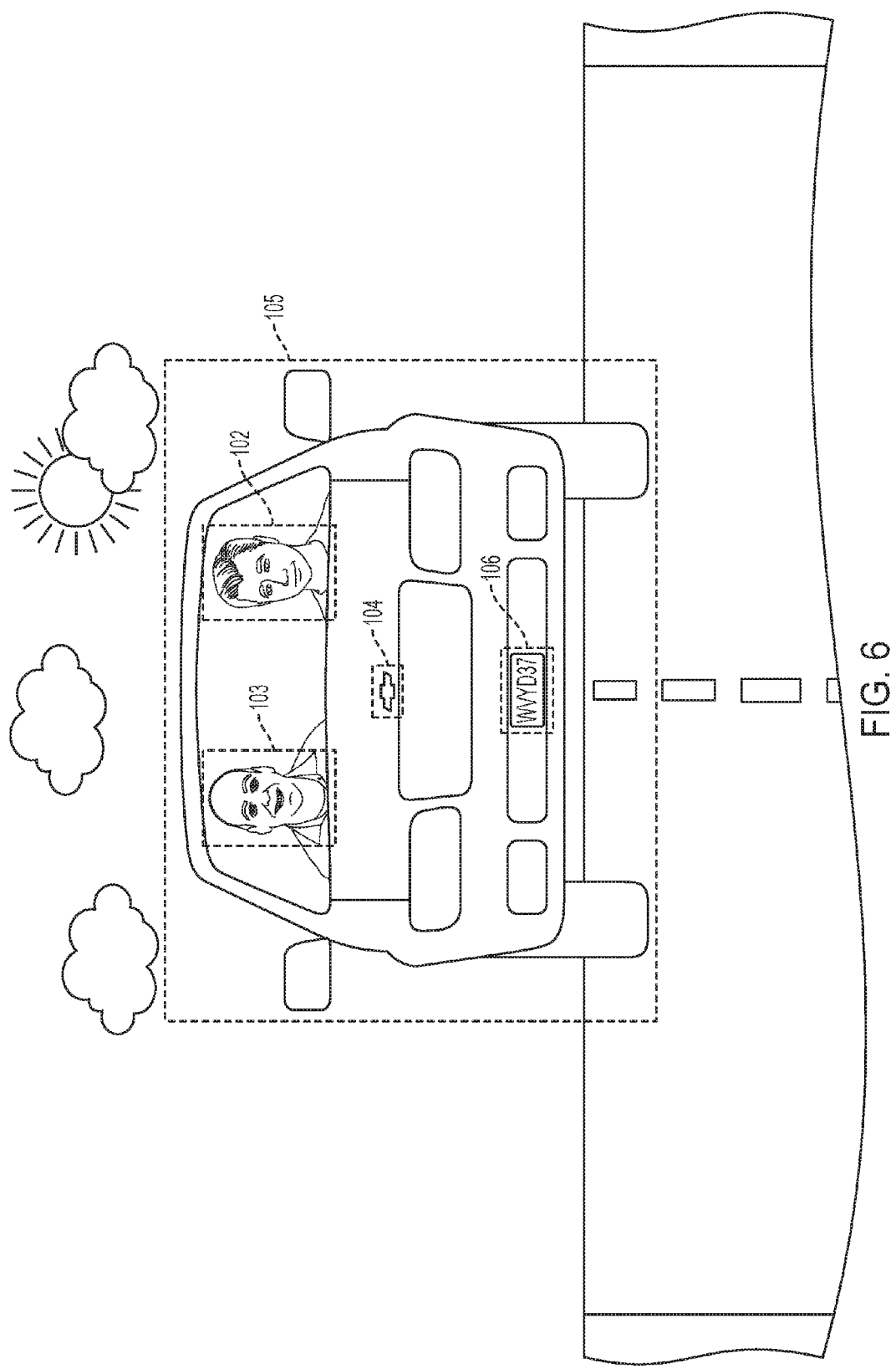
FIG. 6 depicts an exemplary aspect of the method and system.

As shown in FIGS. 5 and 6, rear-view camera 35 will capture real-time video footage of the environment directly behind vehicle 12. As shown, upon a following vehicle 12' entering the environment around vehicle 12, camera 35 will sense the following vehicle 12' and capture an image 101 of the vehicle. The captured image 101 should be configured to fully capture a view of the driver 102, passenger 103, vehicle logo 104, vehicle model 105, and license plate 106.

Figure 7:
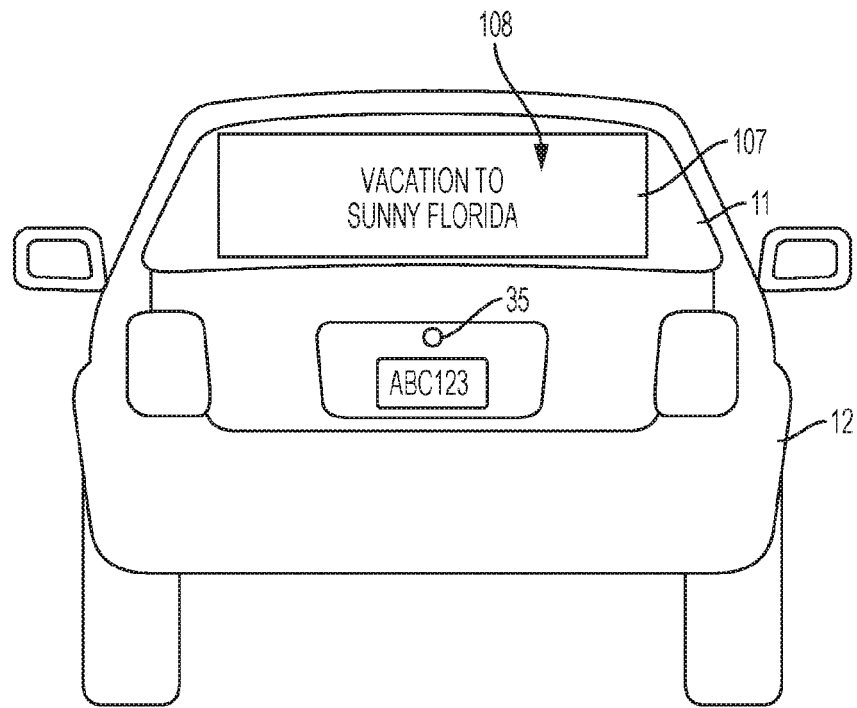
FIG. 7 depicts another exemplary aspect of the method and system.

As shown in FIG. 7, in this embodiment, vehicle 12 has an external display 107 that is a graphics display mounted onto or behind back-glass window 11, the vehicle roof, or at least one vehicle side panel. Upon capturing an image 101, image recognition module 100 will analyze the image for selected objects (i.e., driver 102, passenger 103, vehicle logo 104, vehicle model 105, and license plate 106) and conduct visual symbol comparison analysis to compile various key demographic and psychographic points. For example, module 100 may review the image and calculate each of the driver's observable characteristics and passenger's observable characteristics plus the vehicle logo, model, and license plate number. The module 100 may then compile this information and allow it to be sent off to an advertising exchange 19. The advertising exchange 19 will then return a subjective advertising message 108 to be displayed on external display 107. This allows both driver 102 and passenger 103 to be exposed to the subjective advertising message 108 and provide each a commercial impression for a selected duration of time (e.g., 30 seconds). In this instance, based on the key demographic and psychographic points expressed in FIG. 7, either driver 102 or passenger 103 may be in a demographic/psychographic particular to vacationing in Florida.

Figure 7A:
FIG. 7A depicts another exemplary aspect of the method and system.

In certain embodiments, vehicle VSM 42 and GPS Module 40 will be configured with this system to monitor certain vehicle environment dynamics such as, but not limited to, GPS coordinates, vehicle speed, ambient light, temperature, rain (e.g., via windshield wiper power), and road quality (e.g., via suspension compression). Telematics unit 30 and/or data center 20 may further be in communication with one or more generally known remote road traffic databases 18 to provide traffic speed information and/or weather databases 18 to provide vehicle environment information. As such, with reference to FIG. 7A, the text and image qualities of subjective advertising message 108 may be manipulated to enable adequate exposure in various vehicle environments as well as provide public service announcements relating to the vehicle environment. Telematics unit 30 and/or data center 20 may also dynamically control when the subjective message 108 is being displayed and this may be based on the vehicle speed, local laws, remote database information, and driver distraction statistics.

In another embodiment, window 11 can be embodied as smart glass to define external display 108. The term "smart glass" refers generally to glass or glazing that changes light transmission properties when voltage, light or heat is applied. One example of such technology is polymer dispersed liquid crystal devices. It is understood that, rather that changing light transmission properties of an entire pane of glass, the light transmission properties of specific regions of a pane of glass may be selectively changed. For example, to change the light transmission properties of regions of the window 11 in a manner that makes an accurate presentation that is exhibited and visible from the outside of vehicle 12.

Figure 8:
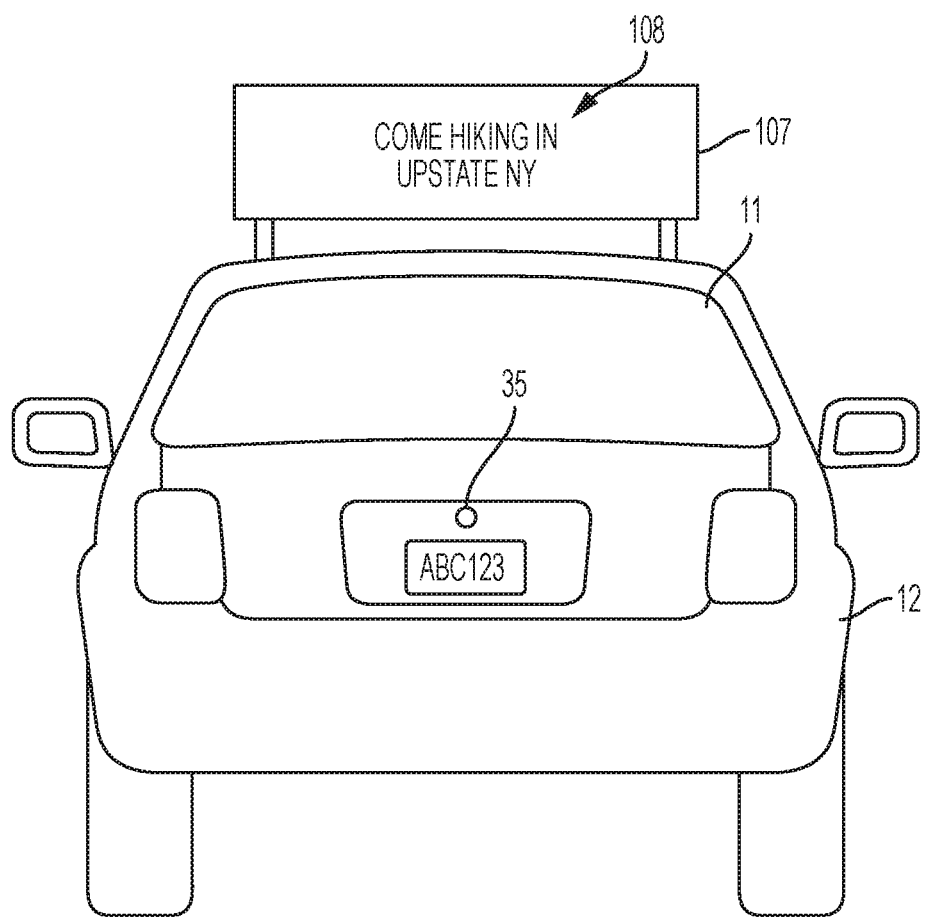
FIG. 8 depicts another embodiment of the method and system.
Figure 9:
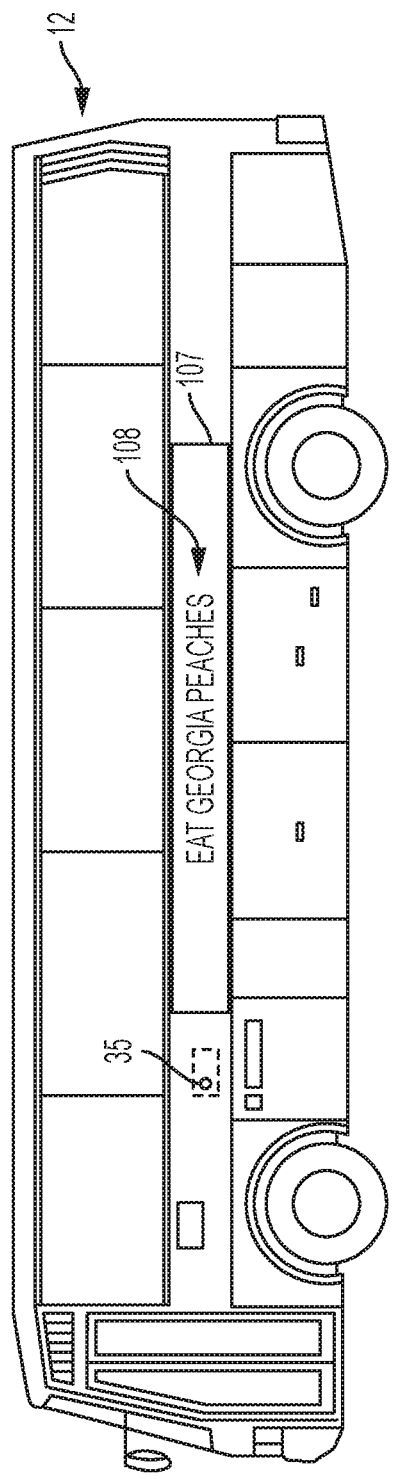
FIG. 9 depicts an exemplary aspect of the method and system being implemented on a different vehicle embodiment.
Figure 10:
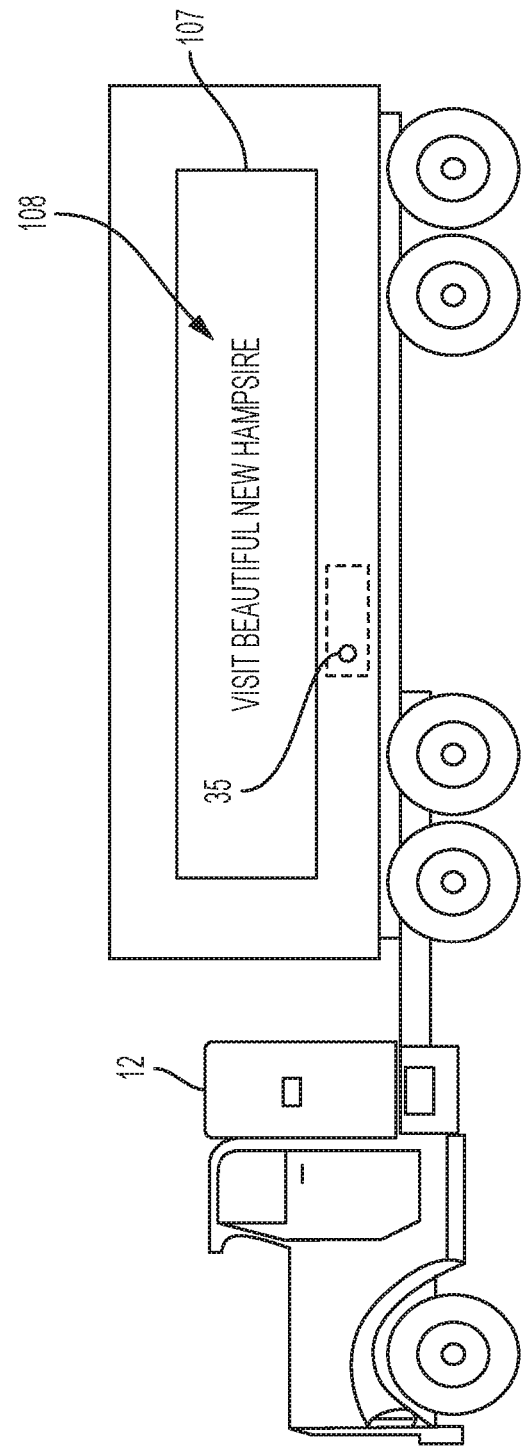
FIG. 10 depicts an exemplary aspect of the method and system being implemented on a different vehicle embodiment.

As shown in FIG. 8, external display 107 can be a vertically-oriented roof sign. Implementing a roof sign display 107 may be preferable when the vehicle does not provide adequate space on its back-glass window 12 or this window is positioned at an awkward angle. As shown in FIG. 9, external display 107 can be installed on a vehicle 12 that is a bus. In such an instance, camera 35 may be located on the side of bus 12 to enable sensing of objects to the side of bus 12 (e.g., pedestrians, parked cars, etc.). It should be understood that, in this embodiment, external display 107 and camera 35 may be located on the back of bus 12, to be operated in a manner similar to the embodiments discuss above. As shown in FIG. 10, external display 107 can be installed on a vehicle 12 that is a trailer hitched to a semi-trailer truck. In such an instance, camera 35 may be located on the side of trailer 12 to enable sensing of objects to the side of the truck and trailer 12 (e.g., pedestrians, parked cars, etc.). It should be understood that, in this embodiment, external display 107 and camera 35 may be located on the back of trailer 12, to be operated in a manner similar to the embodiments discuss above.

Method

Figure 11:
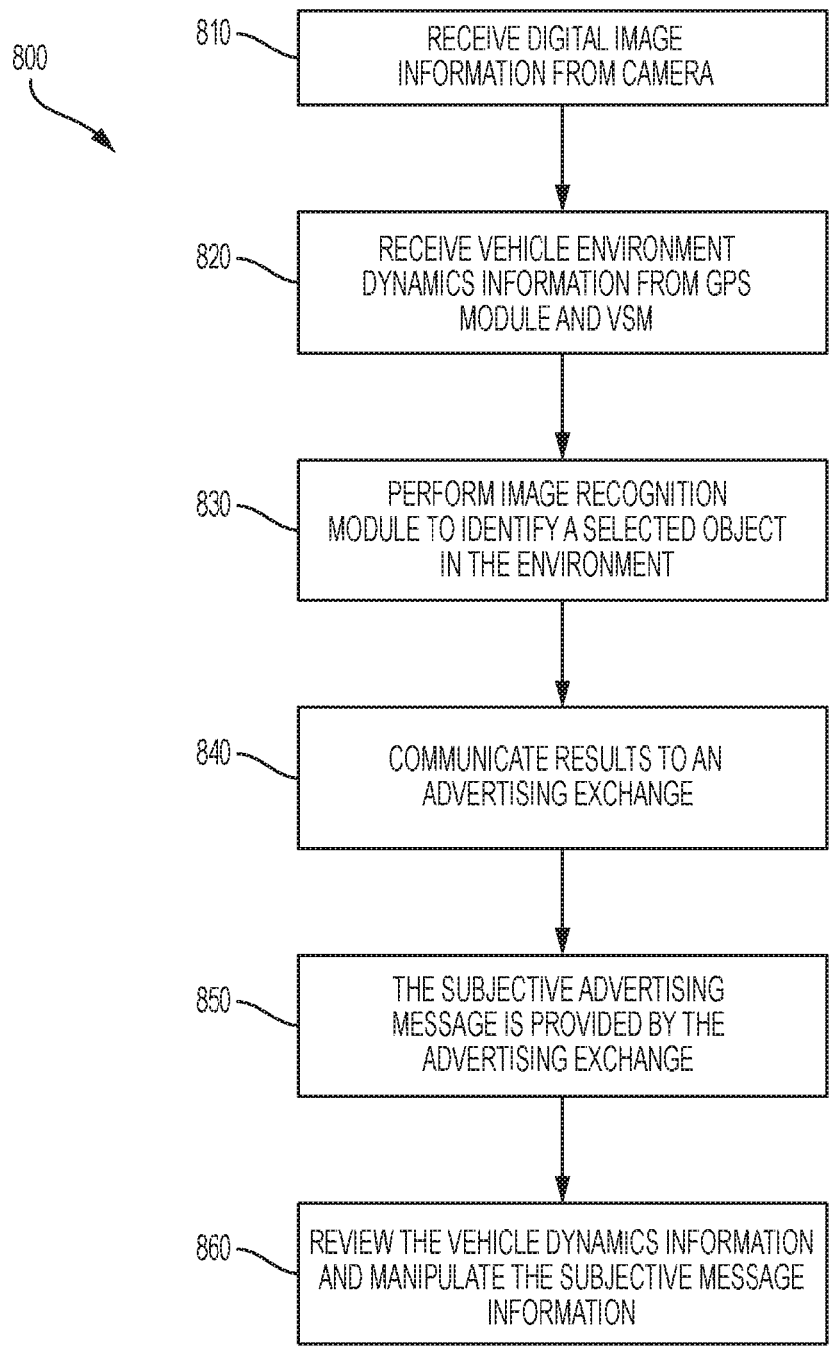
FIG. 11 is a flowchart depicting an exemplary embodiment of the method.

Now turning to FIG. 11, there is shown an embodiment of a method 800 to place a subjective message on a vehicle 12. One or more aspects of method 800 may be completed through the implementation of controller 52 which may include one or more executable instructions incorporated into memory 54 and executed by of telematics unit 30. One or more aspects of method 800 may otherwise, for example, be implemented by server 82 of data center 20 which may include one or more executable instructions incorporated into data base 81.

The method is supported by telematics unit 30 being configured to establish data transmissions with data center 20. This configuration may be made by a vehicle manufacturer at or near the time of the telematics unit's assembly or after-market (e.g., via vehicle download using the afore-described communication system 10 or at a time of vehicle service, just to name a couple of examples). In at least one implementation, one or more instructions are provided to the telematics unit 30 and stored on non-transitory computer-readable medium (e.g., on memory 54).

The method includes step 810 in which telematics unit 30 receives digital image information from rear-view camera 35. This information may be in the form of a single digital image frame captured by camera 35. The image may otherwise be real-time video footage from camera 35 selected in predefined time-duration segments or considered to be continuous. The information moreover includes the environment behind vehicle 12 and generally has at least one object (e.g., driver, passenger, vehicle logo, vehicle model, license plate) to be selected by the image recognition module 100 for analysis.

In step 820, telematics unit 30 receives information regarding the vehicle environment dynamics from both GPS Module 40 and VSM 42. For example, telematics unit 30 may gather coordinate information from GPS Module 40 as well as speedometer, temperature, suspension, or windshield wiper information from VSM 42. Telematics unit 30 may subsequently compile the information. In one embodiment of method 800, telematics unit 30 will compile the vehicle environment dynamics information as well as the digital image information and automatically communicate the digital image information to data center 20 (the vehicle environment dynamics information may or may not also be communicated). Server 82 will then accordingly process the received information. In another embodiment, telematics unit 30 will independently process the vehicle environment dynamics information.

In step 830, in one embodiment of method 800, server 82 will perform image recognition module 100 to identify the selected object (an embodiment of which is discussed above and shown in FIGS. 2-4). In another embodiment, telematics unit 30 will perform the image recognition module 100, stored in digital memory device 54, to identify the selected object. In step 840, once performance of image recognition module 100 is complete, the results are communicated to advertisement exchange 19 (the vehicle environment dynamics information may or may not also be communicated). Depending on the embodiment, these communications are generated from either server 82 or telematics unit 30.

An exemplary advertising exchange 19 is considered to be a mutual organization system that connects advertisers 21 and publishers (i.e., representatives of a usage licensee for display 107) in a unified platform that serves as exchange facilities for advertisers 21, publishers 107, and other market players (i.e., members) to buy and sell advertisements online. Members may trade various advertising audience assets within the advertising exchange 19. While the market players within the advertising exchange 19 system may be buyers and sellers of a variety of assets, the examples may identify them as a buyer entity or seller entity when dealing with an advertising audience asset. When trading in an asset that does not include an advertising audience asset, the examples may identify players as other than a buyer entity or seller entity for clarity. Once a market buyer has purchased an advertising audience asset, they may communicate with the publisher to provide an online advertisement. The publisher may then publish the advertisement as a subjected commercial message through a display such as, but not limited to, external display 107, a website, or mobile computing device interface. Yahoo! Inc®, for example, operates such an advertising exchange. It should be understood that the advertisements are not necessarily required to be commercial in nature.

In step 850, the subjective advertising message (e.g., a commercial advertisement) is provided by advertising exchange 18. In step 860, depending on the embodiment, either telematics unit 30 or server 84 will review aspects of the vehicle dynamics information and manipulate the subjective message information to meet the needs of environment. For example, based on the vehicle speed, the font size and image (e.g., color scheme, brightness, etc.) may be adjusted to allow for the driver and passenger of a following vehicle to be able to adequately read the content of the message. As another example, based on the vehicle environment ambient light, the image (e.g., brightness) may be adjusted. In yet another example, based on the vehicle suspension compression ratio information and/or windshield power information, a public safety announcement message may be displayed on external display as its own subjective advertising message or within a separate subjective advertising message.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to exhibit one or more subjective messages on a vehicle, the system comprising:
   a memory configured to comprise one or more modules of executable instructions;
   a controller configured to read and execute the modules;
   a transceiver configured to communicate one or more data transmissions;

an external display configured to exhibit information on a vehicle, the information being visible in the environment external to the vehicle;
a camera located on the vehicle, the camera configured to view or capture or view and capture an image of a selected portion of the vehicle environment;
an image recognition module;
wherein the executable instructions enable the controller to:
receive, from the camera, an image of the vehicle environment comprising at least one of a driver, passenger, vehicle logo, vehicle model, and license plate;
perform the image recognition module to identify the at least one of a driver, passenger, vehicle logo, vehicle model, and license plate;
receive the results of the image recognition module;
communicate the results, via the transceiver, to an advertising exchange, wherein the advertising exchange facilitates the buying and selling of advertising information from multiple advertising networks, wherein the advertising exchange is configured to enable a publisher to provide advertising information as subjective message information based on the results of the image recognition module through the advertising exchange;
receive subjective message information, via the transceiver, from the advertising exchange; and
operate the external display to exhibit the subjective message information to the vehicle environment.

2. The system of claim 1, further comprising:
at least one GPS module, the GPS module configured to provide vehicle coordinate information;
one or more vehicle system modules (VSMs) configured to provide vehicle dynamics information, wherein the vehicle dynamics information comprises speedometer data information, odometer data information, vehicle suspension compression ratio information, anti-lock brake activity information, vehicle environment temperature data information, vehicle environment ambient light information, and windshield wiper power information;
wherein the executable instructions further enable the controller to:
receive, from the at least one GPS module, vehicle coordinate information;
receive, from the one or more VSMs, vehicle dynamics information; and
manipulate the subjective message information based on both the vehicle dynamics information and the vehicle coordinate information.

3. The system of claim 2, wherein
the manipulation of the subjective message comprises adjustments to at least one of the font size, image color scheme, and image brightness.

4. The system of claim 1, wherein the image recognition module comprises:
a keypoints-based comparison;
a visual symbol comparison comprising a comparison of at least one character or symbol that appears on or in connection with the selected object, wherein the visual symbol comparison comprises a cosine comparison;
a region-based color comparison; and
a sensor modalities analysis.

5. The system of claim 1, wherein the image recognition module comprises a comparison of one or more text, logos, alphanumeric characters, driver observable characteristics, passenger observable characteristics, or a combination thereof.

6. The system of claim 1, wherein the subjective message is commercial in nature.

7. The system of claim 1, wherein the vehicle environment is located behind, on the side of, or above the vehicle.

8. A method to exhibit one or more subjective messages on a vehicle, the method comprising:
providing a memory configured to comprise one or more modules of executable instructions;
providing a controller configured to read and execute the modules;
providing a transceiver configured to communicate one or more data transmissions;
providing an external display configured to exhibit information on a vehicle, the information being visible in the environment external to the vehicle;
providing a camera located on the vehicle, the camera configured to view or capture or view and capture an image of a selected portion of the vehicle environment;
providing an image recognition module;
receiving, from the camera, an image of the vehicle environment comprising at least one of a driver, passenger, vehicle logo, vehicle model, and license plate;
performing, via the controller, the image recognition module to identify the at least one of a driver, passenger, vehicle logo, vehicle model, and license plate;
receiving, at the controller, the results of the image recognition module;
communicating, via the transceiver, the results to an advertising exchange, wherein the advertising exchange facilitates the buying and selling of advertising information from multiple advertising networks, wherein the advertising exchange is configured to enable a publisher to provide advertising information as subjective message information based on the results of the image recognition module through the advertising exchange, via the transceiver, subjective message information from the advertising exchange; and
operating, via the controller, the external display to exhibit the subjective message information to the vehicle environment.

9. The method of claim 8, further comprising:
providing at least one GPS module, the GPS module configured to provide vehicle coordinate information;
providing one or more vehicle system modules (VSMs) configured to provide vehicle dynamics information, wherein the vehicle dynamics information comprises speedometer data information, odometer data information, vehicle suspension compression ratio information, anti-lock brake activity information, vehicle environment temperature data information, vehicle environment ambient light information, and windshield wiper power information;
receiving, from the at least one GPS module, vehicle coordinate information;
receiving, from the one or more VSMs, vehicle dynamics information; and
manipulating, via the controller, the subjective message information based on both the vehicle dynamics information and the vehicle coordinate information.

10. The method of claim 9, wherein
the manipulation of the subjective message comprises adjustments to at least one of the font size, image color scheme, and image brightness.

11. The method of claim 8, wherein the image recognition module comprises:
- a keypoints-based comparison;
- a visual symbol comparison comprising a comparison of at least one character or symbol that appears on or in connection with the selected object, wherein the visual symbol comparison comprises a cosine comparison;
- a region-based color comparison; and
- a sensor modalities analysis.

12. The method of claim 8, wherein the image recognition module comprises a comparison of one or more text, logos, alphanumeric characters, driver observable characteristics, passenger observable characteristics, or a combination thereof.

13. The method of claim 8, wherein the subjective message is commercial in nature.

14. The method of claim 8, wherein the vehicle environment is located behind, on the side of, or above the vehicle.

15. A method to exhibit one or more subjective commercial messages on a vehicle back-glass window, the method comprising:
- providing a memory configured to comprise one or more modules of executable instructions;
- providing a controller configured to read and execute the modules;
- providing a transceiver configured to communicate one or more data transmissions;
- providing an external display configured to exhibit information on the back-glass window, the information being visible in the environment behind the vehicle;
- providing a camera located on the vehicle, the camera configured to view or capture or view and capture an image of a selected portion of the vehicle environment;
- providing an image recognition module;
- providing at least one GPS module, the GPS module configured to provide vehicle coordinate information;
- providing one or more vehicle system modules (VSMs) configured to provide vehicle dynamics information, wherein the vehicle dynamics information comprises speedometer data information, odometer data information, vehicle suspension compression ratio information, anti-lock brake activity information, vehicle environment temperature data information, vehicle environment ambient light information, and windshield wiper power information;
- receiving, from the camera, an image of the vehicle environment comprising a driver, vehicle logo, vehicle model, and license plate;
- receiving, from the one or more VSMs, vehicle dynamics information;
- receiving, from the at least one GPS module, vehicle coordinate information;
- performing, via the controller, the image recognition module to identify at least one of the driver, vehicle logo, vehicle model, and license plate;
- receiving, at the controller, the results of the image recognition module;
- communicating, via the transceiver, the results to an advertising exchange, wherein the advertising exchange facilitates the buying and selling of advertising information from multiple advertising networks, wherein the advertising exchange is configured to enable a publisher to provide advertising information as subjective message information based on the results of the image recognition module through the advertising exchange;
- receiving, via the transceiver, subjective commercial message information from the advertising exchange;
- manipulating, via the controller, the subjective commercial message information based on both the vehicle dynamics information and the vehicle coordinate information;
- operating, via the controller, the external display to exhibit the subjective message information to the vehicle environment.

16. The method of claim 15, wherein the manipulation of the subjective message comprises adjustments to at least one of the font size, image color scheme, and image brightness.

17. The method of claim 15, wherein the image recognition module comprises:
- a keypoints-based comparison;
- a visual symbol comparison comprising a comparison of at least one character or symbol that appears on or in connection with the selected object, wherein the visual symbol comparison comprises a cosine comparison;
- a region-based color comparison; and
- a sensor modalities analysis.

18. The method of claim 15, wherein the image recognition module comprises a comparison of one or more text, logos, alphanumeric characters, driver observable characteristics, passenger observable characteristics, or a combination thereof.

* * * * *